United States Patent [19]

Kobori et al.

[11] Patent Number: 5,669,968
[45] Date of Patent: Sep. 23, 1997

[54] INORGANIC HARDENING COMPOSITION

[75] Inventors: Shigeji Kobori, Satte; Jotaro Morimoto, Kokubunji; Yuji Hatakeyama, Isehara, all of Japan

[73] Assignee: Toyo Chemical Co., Ltd., Kanagawa-ken, Japan

[21] Appl. No.: 544,315

[22] Filed: Oct. 17, 1995

Related U.S. Application Data

[63] Continuation of Ser. No. 322,685, Oct. 13, 1994, abandoned.

[30] Foreign Application Priority Data

Oct. 29, 1993 [JP] Japan .................................. 5-272511

[51] Int. Cl.$^6$ .............................. C04B 7/34; C04B 9/00
[52] U.S. Cl. .......................... 106/696; 106/724; 106/790; 106/800; 106/801; 106/817
[58] Field of Search .................................. 106/800, 801, 106/802, 817, 724, 728, 692, 696, 790

[56] References Cited

U.S. PATENT DOCUMENTS

| | | | |
|---|---|---|---|
| 4,363,665 | 12/1982 | Barrier et al. | 106/624 |
| 4,683,019 | 7/1987 | Motoki | 106/601 |
| 5,036,029 | 7/1991 | Johnson | 581/109 |

OTHER PUBLICATIONS

Japanese Patent Abstract—"Stabilization of Ground" Tazawa et al. (Dec. 6, 1982) JP 57-198782.

*Primary Examiner*—Paul Marcantoni
*Attorney, Agent, or Firm*—Darby & Darby

[57] ABSTRACT

An inorganic hardening composition contains 100 parts by weight of an alkaline earth metal oxide, and 5 to 80 parts by weight of an organic carbonic acid compound.

8 Claims, No Drawings

INORGANIC HARDENING COMPOSITION

This is a continuation of application Ser. No. 08/322,685, filed Oct. 13, 1994, now abandoned.

BACKGROUND OF THE INVENTION

This invention relates to an inorganic hardening composition for civil engineering and construction works. More particularly, it relaters to an inorganic hardening composition which gives a hardened product having high compressive strength and high dimensional accuracy.

There has hitherto been known a phenomenon in which an alkaline earth metal hydroxide is hardened by reaction with a carbonic acid gas in atmosphere. However, with such phenomenon, the rate of reaction is so slow that a hardened mass having a sufficient strength cannot be produced within a reasonable period of time, while the hardened mass has a nonuniform inner structure because of retarded inner carbonization. In order to overcome such problem, a carbonized hardened mass has been proposed which is obtained by wet reacting an alkaline earth metal hydroxide with an organic carbonic acid compound (Japanese Laid-open Patent Publication No. 1-270552).

However, a hardened product employing the alkaline earth metal hydroxide has a drawback that it has a high contraction ratio of $6 \times 10^{-4}$ and poor dimensional accuracy.

SUMMARY OF THE INVENTION

It is therefore an object of the present invention to provide an inorganic hardening composition which is hardened within a reasonable hardening time period and which gives a hardened mass having a high compressive strength and high dimensional accuracy.

The above and other objects of the present invention will become apparent from the following description.

According to the present invention, there is provided an inorganic hardening composition comprising 100 parts by weight of an alkaline earth metal oxide, and 5 to 80 parts by weight of an organic carbonic acid compound.

PREFERRED EMBODIMENTS OF THE INVENTION

The present invention will be further explained in detail hereinbelow.

The inorganic hardening composition contains the alkaline earth metal oxide and the organic carbonic acid compound in a specified mixing ratio. There is no particular limitation to the alkaline earth metal oxide employed in the present invention. Thus it may be soft-burned, that is burned lightly so as to have a low bulk density, or it may be hard-burned, that is burned heavily so as to have a high bulk density. The components of the alkaline earth metal oxide preferably include MgO, CaO, SrO, BaO or double salts thereof, such as CaO.MgO, or mixtures thereof. Of these, MgO is most preferred in view of the handling time and strength that is to be exhibited. The alkaline earth metal oxides may contain natural mineral components, for example metal oxides such as $Fe_2O_3$, $Al_2O_3$, $SiO_2$, $TiO_2$, $Na_2O$ or $K_2O$, carbonates such as $MgCO_3$, $CaCO_3$, $SrCO_3$ or $BaCO_3$, or hydroxides such as $Mg(OH)_2$ or $Ca(OH)_2$. Consequently, the alkaline earth metal oxide produced from natural minerals as a starting material may be employed. The content of the natural mineral components is preferably in a range from 1 to 30 wt % based on the total weight of the composition.

The organic carbonic acid compounds employed in the present invention include olefinic carbonates, such as ethylene carbonate or propylene carbonate, water-soluble carbonates of amine having 1 to 6 carbon atoms, such as methylamine, dimethylamine, diethylamine, trimethylamine, triethylamine, tetramethyl ammonium hydroxide, methanolamine, ethanolamine, propylamine, butylamine, amylamine or hexylamine, and carbonic acid nitrogen compounds, such as carbamic acid or urea. Of these, the olefinic carbonates are most preferred in view of strength that is exhibited with the hardening composition.

The mixing ratio of the alkaline earth metal oxide to the organic carbonic acid compound in the present invention is 5 to 80 parts by weight and preferably 10 to 50 parts by weight to 100 parts by weight of the alkaline earth metal oxide. If the content of the organic carbonic acid compound is less than 5 parts by weight or exceeds 80 parts by weight, both the dimensional accuracy and the compressive strength are lowered.

In addition to the above-mentioned essential ingredients, cement and an additive for cement may also be contained in the inorganic hardening composition of the present invention. Such cement may be enumerated by a variety of Portland cements, blast furnace cement, white cement, alumina cement, magnesium phosphate cement and magnesia oxychloride cement. The amount of addition of the cement is preferably 5 to 100 parts by weight based on 100 parts by weight of the alkaline earth metal oxide. The additive for cement may be enumerated by aggregates, such as silica sand, lime stone or a variety of lightweight aggregates; reinforcement fibers, such as glass fibers, metal fibers or organic fibers, water reducing agents; defoaming agents; foaming agents; chemical mixing agents for cement; and pigments. The content of the aggregates is preferably 30 to 400 parts by weight to 100 parts by weight of the alkaline earth metal oxide. The content of the reinforcement fibers is preferably 0.2 to 20 parts by weight to 100 parts by weight of the alkaline earth metal oxide. The content of the water reducing agent, the defoaming agent, and the foaming agent may preferably be 0.2 to 10 parts by weight to 100 parts by weight of the alkaline earth metal oxide. The pigment may usually be added in an amount of 0.01 to 30 parts by weight to 100 parts by weight of the alkaline earth metal oxide.

The inorganic hardening composition of the present invention may be prepared by kneading the starting material with water which may be in the form of steam or crushed ice. Such kneading may be achieved by any of a method of adding water to a mixture of all of the ingredients of the starting material for the inorganic hardening composition, a method of adding a mixture of the organic carbonic acid compound and water to the alkaline earth metal oxide, or a method of kneading the alkaline earth metal oxide and water and subsequently adding the organic carbonic acid compound to the kneaded mass. It is preferred to employ the liquid organic carbonic acid compound because the amount of water can be diminished and the resulting hardening product may further be improved in compressive strength and dimensional stability. Although there is no limitation to the mixing ratio of water, it is preferably 10 to 100 parts by weight and more preferably 10 to 50 parts by weight of water to 100 parts by weight of the alkaline earth metal oxide in the composition.

The inorganic hardening composition of the present invention is hardened by being kneaded with water so as to be slurried. For molding the slurry, any of cast molding, press molding, extrusion molding or spraying method may be employed taking into account the dimension and the physical properties of the molded articles and the production efficiency. For accelerating the development of strength, the practical strength value may be achieved in one day since the time of casting by curing under heating under wet conditions, such as by steam curing after setting.

For molding, moderate handling time becomes necessary. For controlling the handling time, a setting retarder or a setting accelerator may be employed. The setting retarder includes boric acid, salts thereof, oxycarboxylic acid, salts thereof, ethylene diamine tetraacetate (EDTA), salts thereof, polyhydric alcohols, salts thereof, silicofluorides, or mixtures thereof. The setting accelerator includes $Na_2CO_3$, $K_2CO_3$, Nacl, KCl, $MgCl_2$, $CaCl_2$, sodium aluminate, alum or mixtures thereof. The amount of addition of the setting retarder is preferably 0.5 to 30 parts by weight to 100 parts by weight of the alkaline earth metal oxide, while that of the setting accelerator is preferably 0.5 to 30 parts by weight to 100 parts by weight of the alkaline earth metal oxide.

Since the inorganic hardening composition of the present invention includes the alkaline earth metal oxide and the organic carbonic acid compound as essential ingredients in the specified mixing proportions, it can be hardened within a practically acceptable time period to give a hardened product having superior compressive strength and high dimensional accuracy.

EXAMPLES OF THE INVENTION

The present invention is now explained in more detail with reference to Examples and Comparative Examples, which are given only for illustration and are not intended for limiting the invention.

Examples 1 to 8 and Comparative Examples 1 to 5

To the alkaline earth metal oxides or the alkaline earth metal hydroxides shown in Table 1 were added organic carbonic acid compounds and water in pre-set amounts shown in Table 1 and each resulting mass was slurried by kneading in a mortar mixer. Each of the produced slurries was cast into a 4×4×16 cm size mold frame on a table vibrator and molded under vibration. The molded products were extracted from the mold frame and cured at 20° C. for 28 days to produce hardened samples. The compositions of the respective Examples and Comparative Examples are shown in Table 1.

In Table 1, MgO and $Mg(OH)_2$, including both the soft burned and hard burned products manufactured by NIHON KAISUIKAKO CORPORATION, CaO manufactured by CHICHIBU LIME INDUSTRIES CO. LTD, ethylene carbonate manufactured by TOA GOSEI CHEMICAL INDUSTRY CO., LTD and a first-class reagent of citric acid manufactured by KANTO CHEMICAL CO., INC. were employed.

TABLE 1

| | Alkaline earth metal oxides | | | Alkaline earth metal hydroxides $Mg(OH)_2$ | Organic carbonic acid compounds Ethylene-carbonate | Setting retarder Citric acid | Water |
|---|---|---|---|---|---|---|---|
| | MgO Soft-burned | MgO Hard-burned | CaO | | | | |
| Comp. Ex. 1 | — | — | — | 100 | 15 | — | 50 |
| Comp. Ex. 2 | — | 100 | — | — | 3 | — | 25 |
| Ex. 1 | — | 100 | — | — | 5 | — | 25 |
| Ex. 2 | — | 100 | — | — | 10 | — | 20 |
| Ex. 3 | — | 100 | — | — | 30 | — | 15 |
| Ex. 4 | — | 100 | — | — | 50 | — | 15 |
| Ex. 5 | — | 100 | — | — | 80 | — | 15 |
| Comp. Ex. 3 | — | 100 | — | — | 100 | — | 15 |
| Ex. 6 | 100 | — | — | — | 40 | — | 40 |
| Ex. 7 | 50 | 50 | — | — | 35 | — | 25 |
| Ex. 8 | — | 90 | 10 | — | 20 | 10 | 30 |
| Comp. Ex. 4 | — | 100 | — | — | — | — | 25 |
| Comp. Ex. 5 | 100 | — | — | — | — | — | 60 |

Note: Unit indication is in parts by weight

For each of the hardened products, the bending strength, compressive strength and changes in length were measured by the following methods. The results are shown in Table 2.

The bending strength was measured generally in accordance with JIS R 5201.

The compressive strength was measured generally in accordance with JIS R 5201.

The changes in length were measured as a difference between a reference length at the time of extraction from the mold frame at 20° C. and 60% humidity and the measured length value after ageing for 28 days.

TABLE 2

| | Compressive strength (kgf/cm$^2$) | Bending strength (kgf/cm$^2$) | Changes in length (×10$^{-6}$) | Setting time (minutes) |
|---|---|---|---|---|
| Comp. Ex. 1 | 138 | 28 | −796 | 300 |
| Comp. Ex. 2 | 203 | 46 | −843 | 240 |
| Ex. 1 | 316 | 57 | −425 | 180 |
| Ex. 2 | 497 | 73 | −172 | 160 |
| Ex. 3 | 563 | 90 | −135 | 120 |
| Ex. 4 | 470 | 71 | −198 | 80 |
| Ex. 5 | 330 | 54 | −366 | 50 |
| Comp. Ex. 3 | 171 | 24 | −904 | 40 |
| Ex. 6 | 354 | 60 | +103 | 30 |
| Ex. 7 | 452 | 67 | −67 | 60 |
| Ex. 8 | 267 | 49 | +280 | 5 |
| Comp. Ex. 4 | 65 | 8 | −910 | 410 |
| Comp. Ex. 5 | 30 | 4 | +721 | 380 |

As shown in the above Table 2, with the Examples 1 to 8 in which 5 to 80 parts by weight of the organic carbonic acid compound were added to 100 parts by weight of the alkaline earth metal oxide, hardened products having the compressive strength of 267 to 563 kgf/cm$^2$ and having excellent dimensional stability with the changes in length being ±600×10$^{-6}$ or less, could be obtained.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An inorganic hardening composition consisting essentially of 100 parts by weight of MgO, and 5 to 80 parts by weight of ethylene carbonate.

2. An inorganic hardening composition consisting essentially of 100 parts by weight of MgO, 5 to 80 parts by weight of ethylene carbonate, and 0.5 to 30 parts by weight of a setting accelerator.

3. The composition as claimed in claim 2 wherein said setting accelerator is selected from the group consisting of Na$_2$CO$_3$, K$_2$CO$_3$, NaCl, Kcl, MgCl$_2$, CaCl$_2$, sodium aluminate, alum and mixtures thereof.

4. An inorganic hardening composition consisting essentially of 100 parts by weight of MgO, 5 to 80 parts by weight of ethylene carbonate, and 5 to 100 parts by weight of a cement.

5. The composition as claimed in claim 4 wherein said cement is selected from the group consisting of Portland cements, blast furnace cement, alumina cement, magnesium phosphate cement, magnesia oxychloride cement, and mixtures thereof.

6. An inorganic hardening composition consisting essentially of 100 parts by weight of MgO, 5 to 80 parts by weight of ethylene carbonate, and 0.5 to 30 parts by weight of a setting retarder.

7. The composition as claimed in claim 4, wherein said setting retarder is selected from the group consisting of boric acid and salts thereof, oxycarboxylic acid and salts thereof, ethylene diamine tetraacetate (EDTA) and salts thereof, polyhydric alcohols and salts thereof, silicofluorides, and mixtures thereof.

8. An inorganic hardening composition consisting essentially of 100 parts by weight of MgO, 5 to 80 parts by weight of ethylene carbonate, and a natural mineral component selected from the group consisting of Fe$_2$O$_3$, Al$_2$O$_3$, SiO$_2$, TiO$_2$, Na$_2$O, K$_2$O, MgCO$_3$, CaCO$_3$, SrCO$_3$, BaCO$_3$, Mg(OH)$_2$, Ca(OH)$_2$, and mixtures thereof, said MgO and said ethylene carbonate in combination being contained in an amount of 70 to 99 wt % based on total weight of the composition, and said natural mineral component being contained in an amount of 1 to 30 wt % based on total weight of the composition.

* * * * *